United States Patent
Kumar

(10) Patent No.: US 10,932,307 B2
(45) Date of Patent: Feb. 23, 2021

(54) METHOD AND DEVICE FOR PROVIDING WIRELESS DATA COMMUNICATION IN DATACENTERS

(71) Applicant: Wipro Limited, Bangalore (IN)

(72) Inventor: Kundan Kumar, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/281,768

(22) Filed: Feb. 21, 2019

(65) Prior Publication Data

US 2020/0214058 A1 Jul. 2, 2020

(30) Foreign Application Priority Data

Dec. 31, 2018 (IN) .............................. 201841049975

(51) Int. Cl.
*G06F 15/16* (2006.01)
*H04W 76/12* (2018.01)
*H04W 28/02* (2009.01)

(52) U.S. Cl.
CPC ....... *H04W 76/12* (2018.02); *H04W 28/0215* (2013.01)

(58) Field of Classification Search
CPC .......................... H04W 76/12; H04W 28/0215
See application file for complete search history.

(56) References Cited

U.S. PATENT DOCUMENTS

| | | | | |
|---|---|---|---|---|
| 7,013,322 | B2 * | 3/2006 | Lahr | H04L 29/06 709/201 |
| 8,655,328 | B2 | 2/2014 | Dossas et al. | |
| 9,049,030 | B1 * | 6/2015 | Pogde | H04L 12/4675 |
| 9,536,244 | B1 * | 1/2017 | Amiel | G06F 9/44526 |
| 10,097,448 | B1 * | 10/2018 | Howard | H04L 43/0894 |
| 10,528,412 | B2 * | 1/2020 | Batchelor | G06F 11/0751 |
| 2010/0325086 | A1 * | 12/2010 | Skinner | G06F 16/9577 707/609 |
| 2011/0317743 | A1 | 12/2011 | DeCusatis et al. | |

(Continued)

FOREIGN PATENT DOCUMENTS

WO 2011126775 A2 10/2011

*Primary Examiner* — Jonathan A Bui
(74) *Attorney, Agent, or Firm* — Finnegan, Henderson, Farabow, Garrett & Dunner, LLP

(57) ABSTRACT

The present disclosure discloses method and a wireless device for providing wireless data communication in datacenters. The wireless communication is enabled in datacenters by providing a plurality of wireless devices. Each of plurality the of wireless devices is integrated with one or more wireless chips. The one or more wireless chips are integrated with converged network technique for facilitating wireless communication. Among plurality of wireless devices, a wireless device receives data request from a user device and transmits data request via respective integrated one or more wireless chip to first wireless device of plurality of wireless devices. The first wireless device receives data request via respective integrated one or more wireless chip. The wireless device receives requested data processed by first wireless device and transmits to the user device wirelessly. The present disclosure eliminates physical cabling or requirement of support person in datacenters by implementing robust and redundant wireless solution.

7 Claims, 5 Drawing Sheets

(56) References Cited

U.S. PATENT DOCUMENTS

| | | | |
|---|---|---|---|
| 2013/0311424 A1* | 11/2013 | Bartolome Rodrigo | G06F 16/21 707/609 |
| 2013/0311778 A1* | 11/2013 | Cherukuri | H04L 63/0272 713/171 |
| 2014/0344890 A1* | 11/2014 | Warrick | H04L 63/0281 726/1 |
| 2014/0351442 A1* | 11/2014 | Fernandez-Palacios | H04L 41/0893 709/226 |
| 2016/0328252 A1* | 11/2016 | Singh | G06F 9/45558 |
| 2017/0147656 A1* | 5/2017 | Choudhary | H04L 67/2814 |
| 2017/0244705 A1* | 8/2017 | Ha | H04L 63/061 |
| 2018/0310240 A1* | 10/2018 | Kannan | H04W 48/20 |
| 2019/0104207 A1* | 4/2019 | Goel | H04L 49/25 |
| 2019/0158315 A1* | 5/2019 | Cao | H04L 65/1006 |
| 2019/0158408 A1* | 5/2019 | Li | H04L 45/306 |
| 2019/0215729 A1* | 7/2019 | Oyman | H04L 65/80 |
| 2019/0361991 A1* | 11/2019 | Rittman | G06F 21/575 |
| 2020/0314030 A1* | 10/2020 | Goel | H04L 69/22 |

* cited by examiner

METHOD AND DEVICE FOR PROVIDING WIRELESS DATA COMMUNICATION IN DATACENTERS

TECHNICAL FIELD

The present subject matter is related in general to wireless communication in datacenter network, more particularly, but not exclusively to a method and system for providing wireless data communication for datacentres.

BACKGROUND

Lately, datacenter is becoming an integral part of computing infrastructures of most enterprises. Therefore, concept of datacenter networks is receiving increased attention in network research community. Nowadays, Information Technology (IT) enterprises have thousands of devices such as, servers, storage, printers, switches and the like, connected physically via network cable to support end users. Most datacenter networks deployed today are classified as wired datacenter networks, as copper, and optical fibre cables are used for intra- and inter-rack connections in the network.

In current datacenter designs, physical connectivity contributes immensely. However, such designs initially require huge manual efforts. Additionally, at a later stage, there is requirement of a dedicated person physically to support incident caused at physical location of the datacenters. Currently, many incidents are caused at physical location due to loosen connection or unplugged or faulty cable and the like. Also, additional delay in resolution may be encountered when there is a need for assistant or support or troubleshoots at the physical location of the datacenters which requires end to end network cabling/patching. Thus, the enterprises experience periodic disruption due to disruption at the physical location which affect the end user connectivity, application down time and impacts overall business.

Currently, many other techniques are being followed in industry for communication in datacenters. In one such technique, the datacenter may include a plurality of computing units which communicates with each other by using high frequency Radio Frequency (RF) wireless communication. The datacenter may organize the computing units into groups (e.g., racks) where each group may form a three-dimensional structure, such as a column having a free-space region for accommodating intra-group communication among computing units. Each rack may also include a rack-level switching mechanism for routing data to and from computing units within the rack. One or more higher-level switching mechanisms may couple the racks together. Hence, communication between computing units in a datacenter may involve sending data "up" and "down" through a hierarchical switching structure. Though, the hierarchical organization of computing units has proven effective for many datacenter applications. However, the hierarchical nature of the switching structure can lead to bottlenecks in data flow for certain systems, particularly the systems which involve communication between computing units in different racks.

Further, there are some other techniques followed in industry for communication within the datacenters, which involve generating wireless management data signal from management data. The wireless management data signal is configured to be transmitted at frequencies matching ambient electromagnetic noise emitted by the datacenter, such that the wireless management data signal is masked in the ambient electromagnetic noise emitted by the datacenter. However, such techniques do not mention integration of wireless devices integration to existing hardware in order to facilitate the communication without using the physical cables.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for providing wireless data communication for datacenters. The method includes receiving a data request from a user device associated with a user. A plurality of wireless devices is configured in a wireless datacenter. Each of the plurality of wireless devices are integrated with one or more wireless chips and the one or more wireless chips are configured with converged network capabilities for facilitating the wireless communication. Further, the method includes transmitting the data request via respective integrated one or more wireless chips of the wireless device to a first wireless device of the plurality of wireless devices associated with the data request. The first wireless device receives the data request via respective integrated one or more wireless chips. Furthermore, the method comprises receiving requested data from the first wireless device. The first wireless device processes the data request to provide the requested data. Thereafter, the method comprises transmitting the requested data to the user device.

In an embodiment, the present disclosure may relate to a wireless device of a plurality of wireless devices for providing wireless data communication for datacenters. The wireless device may include a processor and a memory communicatively coupled to the processor, where the memory stores processor executable instructions, which, on execution, may cause the wireless device to receive a data request from a user device associated with a user. Each of the plurality of wireless devices are integrated with one or more wireless chips and the one or more wireless chips are configured with converged network capabilities for facilitating the wireless communication. The wireless device transmits the data request via respective integrated one or more wireless chips of the wireless device to a first wireless device of the plurality of wireless devices associated with the data request. The first wireless device receives the data request via respective integrated one or more wireless chips. Further, the wireless device receives requested data from the first wireless device. The first wireless device processes the data request to provide the requested data. Thereafter, the wireless device transmits the requested data to the user device.

In an embodiment, the present disclosure relates to a non-transitory computer readable medium including instructions stored thereon that when processed by at least one processor may cause a wireless device to receive a data request from a user device associated with a user. Each of the plurality of wireless devices are integrated with one or more wireless chips and the one or more wireless chips are configured with converged network capabilities for facilitating the wireless communication. The instruction causes the processor to transmit the data request via respective integrated one or more wireless chips of the wireless device to a first wireless device of the plurality of wireless devices associated with the data request. The instruction causes the processor to receive the data request via respective integrated one or more wireless chips. Further, the instruction causes the processor to receive requested data from the first wireless device. The first wireless device processes the data request to provide the requested data. Thereafter, the instruction causes the processor to transmit the requested data to the user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1A and FIG. 1B collectively illustrate exemplary environment for providing wireless data communication in datacenters in accordance with some embodiments of the present disclosure;

Figure 1A:
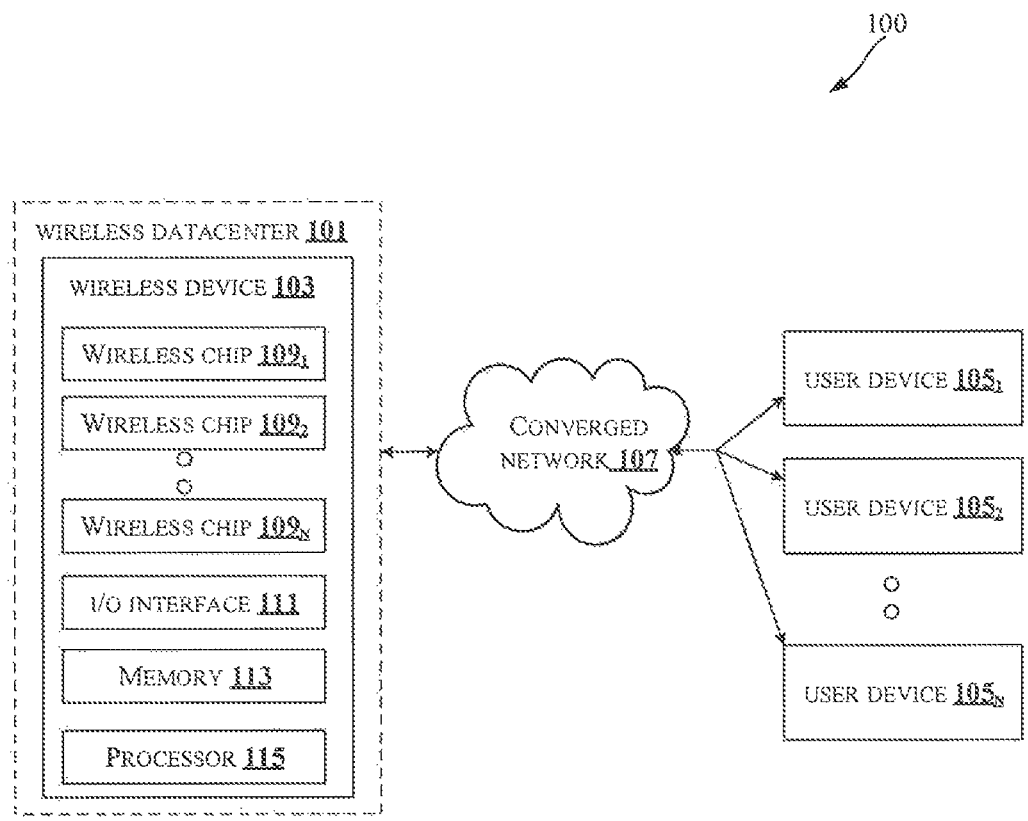

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and a wireless device for providing wireless data communication in datacenters. In an embodiment, a datacenter refers to a physical or virtual infrastructure used by enterprises to accommodate computing units such as, computers, servers and networking systems and components for storing, processing and serving large amounts of data. In the present disclosure, wireless communication may be enabled in the datacenters by providing a plurality of wireless devices. Each of the plurality of wireless devices is integrated with one or more wireless chips. Thus, whenever any data request arrives from a user device, a wireless device from the plurality of wireless devices receives the request through respective one or more wireless chips. In an embodiment, the one or more wireless chips may be integrated with converged network technique for facilitating the wireless communication. The data request may be transmitted by the wireless device through corresponding one or more wireless chips to a wireless device associated with the request for processing. Requested data processed by the associated wireless device may be received and transmitted to the user device wirelessly. The present disclosure eliminates physical cabling or requirement of a support person in the datacenters by implementing robust and redundant wireless solution.

Figure 1B:
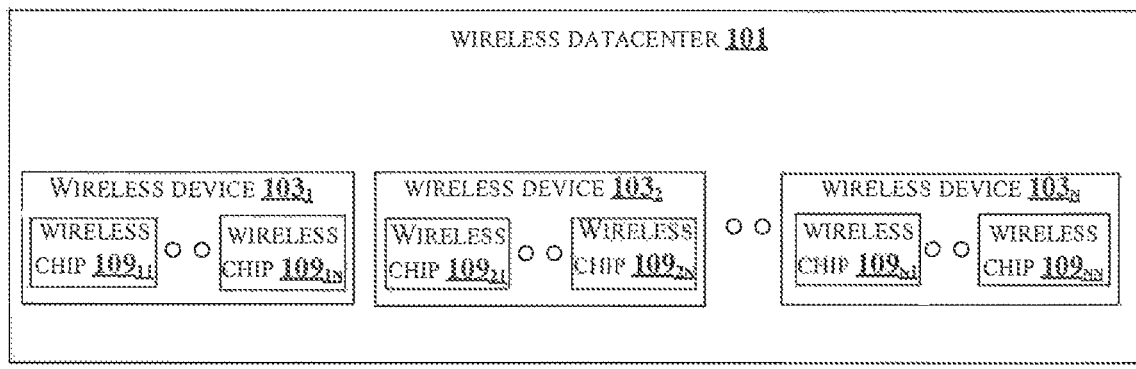

FIG. 1A and FIG. 1B illustrate exemplary environment for providing wireless data communication in datacenters in accordance with some embodiments of the present disclosure.

As shown in FIG. 1A, an environment 100 includes a wireless datacenter 101 comprising a wireless device 103. In an embodiment, the wireless datacenter 101 may refer to a physical or virtual infrastructure used by enterprises to accommodate computing units such as, computers, servers and networking systems and components for storing, processing and serving large amounts of data. The wireless datacenter 101 encompasses a wireless device $103_1$, a wireless device $103_2$, . . . and a wireless device $103_N$ (collectively referred as plurality of wireless devices $103_N$) as shown in FIG. 1B. Returning to the FIG. 1A, the wireless device 103 may be connected through a wireless converged network 107 to a user device $105_1$, a user device $105_2$ . . . and a user device $105_N$ (collectively referred as user devices 105). The wireless device 103 may be incorporated with a wireless chip 109$_1$, a wireless chip 109$_2$, ... and a wireless chip 109$_N$ (collectively referred as one or more wireless chips 109). Similarly, each of the plurality of wireless devices 103$_N$ as shown in the FIG. 1B is integrated with one or more wireless chips 109. In an embodiment, the one or more wireless chips 109 may refer to a set of integrated circuit chips which performs various functions required for the plurality of wireless devices 103$_N$ to communicate over a wireless network.

In an embodiment, more than one wireless chip integrated with each of the plurality of wireless devices 103$_N$ may be used whenever data transmission requires bandwidth more than bandwidth capability of a single wireless chip on the plurality of wireless devices 103$_N$. Further, the user devices 105 may request data from the wireless device 103 of the wireless datacenter 101. In an embodiment, the user devices 105 may be any computing devices associated with users, for example, a laptop, a desktop computer, a Personal Digital Assistant (PDA), a notebook, a smartphone, a tablet, a microphone and any other computing devices. A person skilled in the art would understand that the scope of the present disclosure may encompass any other input user devices, for providing the data request, not mentioned herein explicitly. In an embodiment, the user devices 105 may be wirelessly enabled to communicate with the wireless device 103 to facilitate the wireless communication, via the converged network 107. In an implementation, the converged network 107 refers to a single network with a capacity to carry a combination of data, voice and video traffic. The converged network 107 may be implemented based on a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like.

The wireless device 103 may provide wireless data communication in the wireless datacenter 101. In an embodiment, the wireless device 103 may include, but is not limited to, storage device, printers, servers, switches, backup devices and any other computing devices. A person skilled in the art would understand that, any other devices, not mentioned explicitly, may also be used as the wireless device 103 in the present disclosure. Further, the wireless device 103 may include an I/O interface 111, a memory 113 and a processor 115. The I/O interface 111 may be configured to receive data request from the user devices 105 and requested data from other wireless devices of the plurality of wireless devices 103$_N$. The user request and the requested data received from the I/O interface 111 may be stored in the memory 113. The memory 113 may be communicatively coupled to the processor 115 of the wireless device 103. The memory 113 may also store processor instructions which may cause the processor 115 to execute the instructions for providing wireless data communication.

Whenever the data request arrives from a user device of the user devices 105, the wireless device 103 receives the data request via the one or more wireless chips 109. In an embodiment, the user devices 105 may be wirelessly enabled to communicate with the plurality of wireless devices 103$_N$ to facilitate the wireless communication. In an embodiment, the one or more wireless chips 109 may be configured with converged network capabilities for facilitating the wireless communication. The wireless device 103 transmits the data request via respective integrated one or more wireless chips 109 to a first wireless device associated with the data request. In an embodiment, the first wireless device is from the plurality of wireless devices 103N and the first wireless device receives the data request via respective integrated one or more wireless chips. In an embodiment, the wireless device 103 may match one or more network parameters with network parameters of the user device using the converged network capabilities. For example, the network parameters may include, bandwidth rate, throughput and the like. In an embodiment, whenever a non-performing user device sends low amount of data using dedicated media, the converged network capabilities create a tunnel for data transmission and facilitates in efficient usage of the one or more network parameters.

Further, on receiving the data request, the first wireless device may process the data request. In an embodiment, the processing of the data request may vary based on the type of the wireless device. On processing the data request, the wireless device 103 may receive requested data from the first wireless device. Thereafter, the wireless device 103 may transmit the requested data to the user device of the user devices 105 wirelessly.

Figure 2:
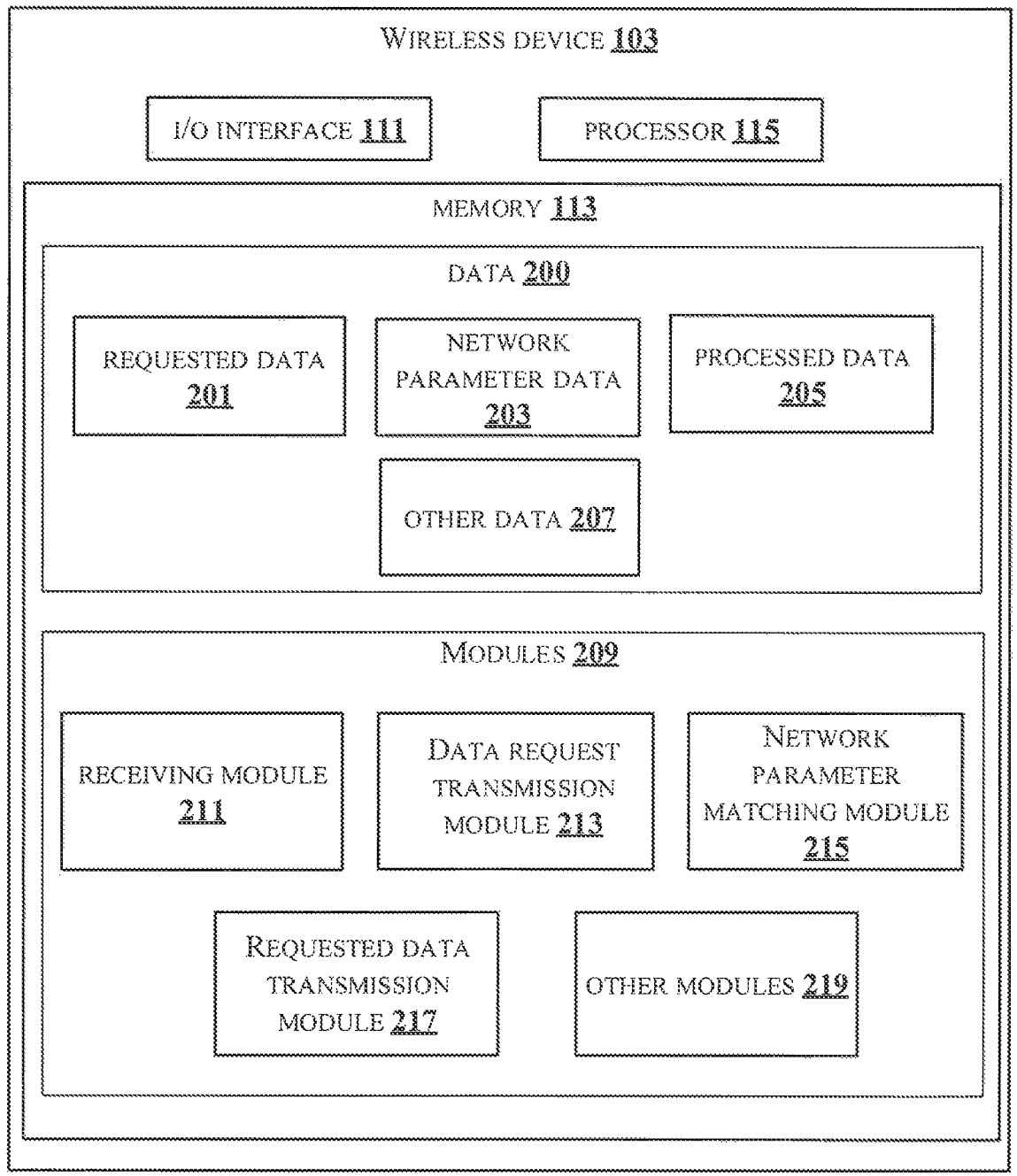
FIG. 2 shows a detailed block diagram of a wireless device in accordance with some embodiments of the present disclosure.

FIG. 2 shows a detailed block diagram of a wireless device in accordance with some embodiments of the present disclosure.

The wireless device 103 may include data 200 and one or more modules 209 which are described herein in detail. In an embodiment, data 200 may be stored within the memory 113. The data 200 may include, for example, requested data 201, network parameter data 203, processed data 205 and other data 207.

The requested data 201 may include the data request received from the user devices 105. In an embodiment, the data request may be in form of wireless data signals. In an embodiment, the data request may be associated with one of the wireless devices of the plurality of wireless devices 103$_N$.

The network parameter data 203 may include information regarding the one or more network parameters associated with each of the plurality of wireless devices 103$_N$. In an embodiment, the one or more network parameters may include bandwidth, throughput and the like. Particularly, the information may include the bandwidth and throughout rate of each of the one or more wireless chips 109 associated with each of the plurality of wireless devices 103$_N$.

The processed data 205 may include the requested data processed by the first wireless device of the plurality of wireless devices 103$_N$ to which the data request may be transmitted. In an embodiment, the first wireless device may either provide the requested data or retrieve from a storage module (not shown explicitly in FIG. 2).

The other data 207 may store data, including temporary data and temporary files, generated by modules 209 for performing the various functions of the wireless device 103.

In an embodiment, the data 200 in the memory 113 are processed by the one or more modules 209 present within the memory 113 of the wireless device 103. In an embodiment, the one or more modules 209 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 209 may be communicatively coupled to the processor 115 for performing one or more functions of the wireless device 103. The modules 209 when configured with the functionality defined in the present disclosure will result in a novel hardware.

In one implementation, the one or more modules 209 may include, but are not limited to a receiving module 211, a data request transmission module 213, a network parameter matching module 215 and a requested data transmission module 217. The one or more modules 209 may also include other modules 219 to perform various miscellaneous functionalities of the wireless device 103. In an embodiment, the other modules 219 may include a processing module and a storage module. The processing module may be associated with one or more wireless devices, such as the first wireless device of the plurality of wireless devices $103_N$. The processing module may receive the data request and process the data request to provide the requested data. The storage module may store data of the one or more wireless device of the plurality of wireless devices $103_N$.

The receiving module 211 may receive the data request from the user device of the user devices 105. For example, the data request may be for retrieving a file from backup. In an embodiment, the receiving module 211 may receive the data request via the one or more wireless chips 109 of the wireless device 103. In an embodiment, the user devices 105 may be wirelessly enabled to communicate with the wireless device 103 in order to facilitate the wireless communication. Further, the receiving module 211 may receive the requested data from the first wireless device associated with the data request.

The data request transmission module 213 may transmit the data request via the one or more wireless chips 109 to the first wireless device of the plurality of wireless devices $103_N$. The first wireless device may be one among the plurality of wireless devices $103_N$ which may be associated with the data request. In an embodiment, the first wireless device may receive the data request via respective integrated one or more wireless chips. In an embodiment, the plurality of devices $103_N$ may be configured with one or more dedicated chips which may be used for transmitting data. The transmitted data from the one or more dedicated chips may reach a wireless switch in the wireless datacenter 101 which comprises converged capability to deal with required bandwidth.

The network parameter matching module 215 may match the one or more network parameters of the plurality of wireless devices $103_N$ with network parameters of the user device using the converged network capabilities. In an embodiment, a tunnel may be created for data transmission using the converged network capabilities. The converged network capabilities facilitate in efficient usage of the one or more network parameters whenever a non-performing user device sends low amount of data using dedicated media particularly, in the converged network capabilities the large tunnel is introduced inside a device by clubbing multiple interfaces. For example, if a network switch comprises twenty ports of two gigabytes each, and internally at hardware level each of the network switch may be clubbed to two to four circuits carrying ten gigabytes with four tunnels to effectively manage the bandwidth requirement.

The requested data transmission module 217 may transmit the requested data received from the first wireless device to the user device of the user devices 105 via the one or more wireless chips 109.

Figure 3:
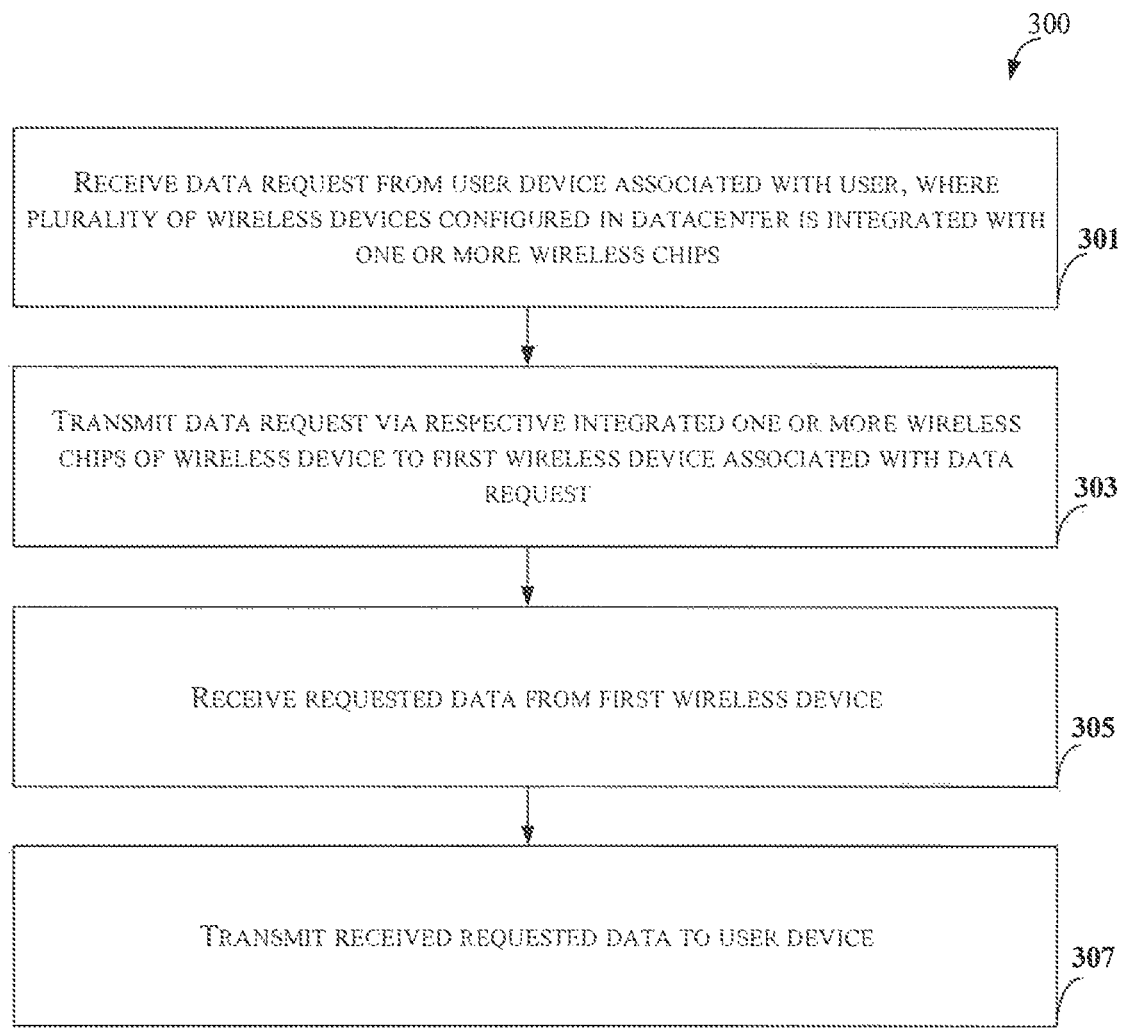
FIG. 3 illustrates a flowchart showing a method for providing wireless data communication in datacenters in accordance with some embodiments of present disclosure.

FIG. 3 illustrates a flowchart showing a method for providing wireless data communication in datacenters in accordance with some embodiments of present disclosure.

As illustrated in FIG. 3, the method 300 includes one or more blocks for providing wireless data communication in datacenters. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the data request is received by the receiving module 211 from the user device of the user devices 105. In an embodiment, the user device may be wirelessly enabled to communicate with the plurality of wireless devices $103_N$ to facilitate the wireless communication.

At block 303, the data request is transmitted by the data request transmission module 213 via respective integrated one or more wireless chips of the wireless device 103 to the first wireless device of the plurality of wireless devices $103_N$ associated with the data request. In an embodiment, the first wireless device receives the data request via respective integrated one or more wireless chips 109.

At block 305, the requested data is received by the receiving module 211 from the first wireless device. In an embodiment, the first wireless device processes the data request to provide the requested data.

At block 307, the requested data is transmitted by the requested data transmission module 217 to the user device of the user devices 105.

Figure 4:
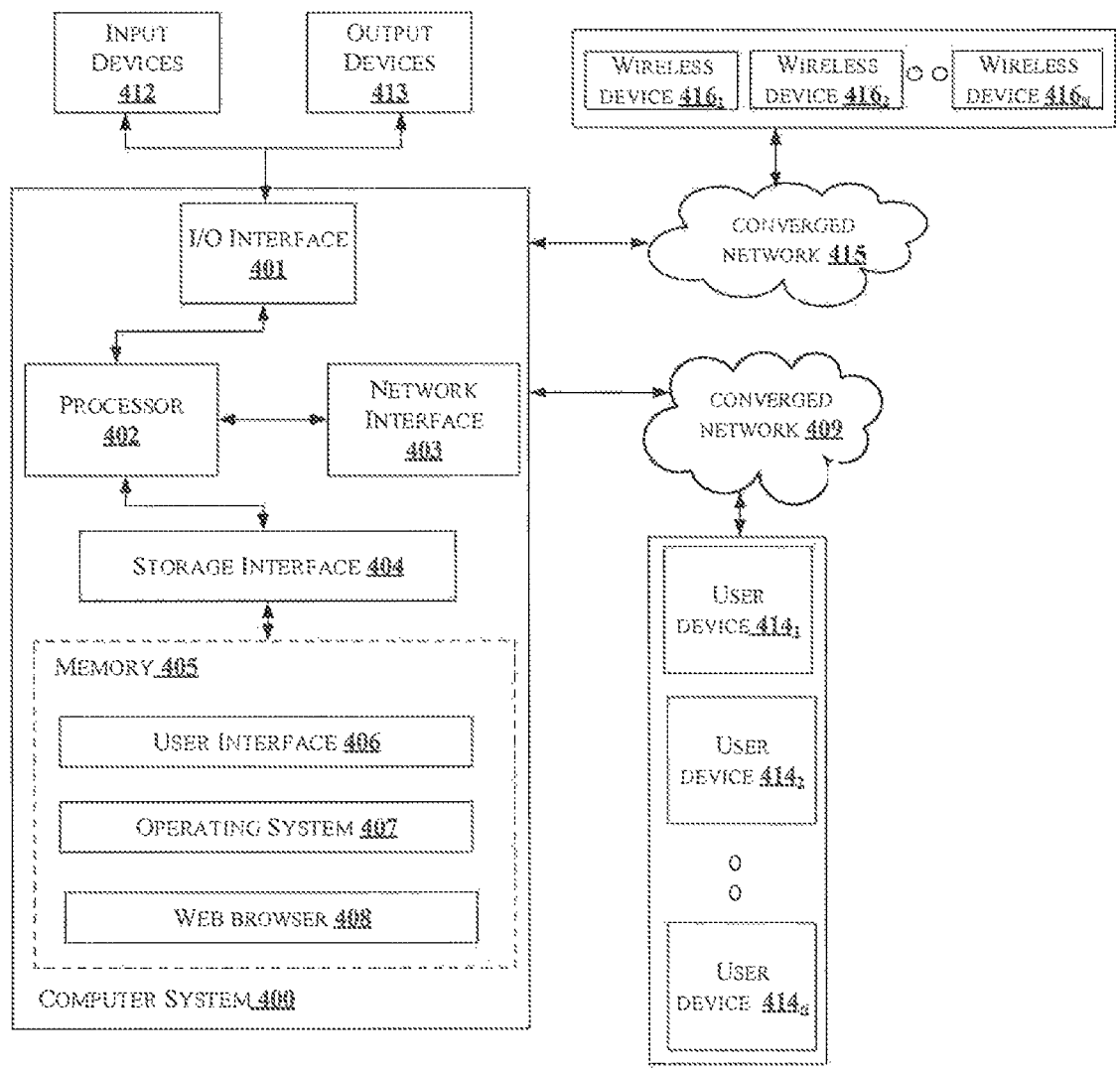
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be used to implement the wireless device 103. The computer system 400 may include a central processing unit ("CPU" or "processor") 402. The processor 402 may include at least one data processor for providing wireless data communication in datacenters. The processor 402 may include specialized processing units such as, integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE®-1394, serial bus, universal serial bus (USB®), infrared, PS/2, BNC, coaxial, component, composite, digital visual interface (DVI), high-definition multimedia interface (HDMI®), RF antennas, S-Video, VGA, IEEE® 802.n/b/g/n/x, Bluetooth®, cellular (e.g., code-division multiple access (CDMA), high-speed packet access (HSPA+), global system for mobile communications (GSM™), long-term evolution (LTE™), WiMax™, or the like), etc.

Using the I/O interface 401, the computer system 400 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED™), plasma, Plasma display panel (PDP), Organic light-emitting diode display (OLED) or the like), audio speaker, etc.

In some embodiments, the computer system 400 consists of the wireless device 103. The processor 402 may be disposed in communication with a converged network 409 and converged network 415 via a network interface 403. The network interface 403 may communicate with the converged network 409. The network interface 403 may employ connection protocols including, without limitation, direct connect, Ethernet (e.g., twisted pair 10/100/1000 Base T), transmission control protocol/internet protocol (TCP/IP), token ring, IEEE® 802.11a/b/g/n/x, etc. The converged network 409 may include, without limitation, a direct interconnection, local area network (LAN), wide area network (WAN), wireless network (e.g., using Wireless Application Protocol), the Internet, etc. Using the network interface 403 and the converged network 409, the computer system 400 may communicate with a user device $414_1$, a user device $414_2$ . . . and a user device $414_N$ (referred as user devices 414). Further, using the network interface 403 and the converged network 415, the computer system 400 may communicate with other wireless device $416_1$, a wireless device $416_2$ . . . and a wireless device $416_N$ (referred as plurality of wireless devices 416). The network interface 403 may employ connection protocols include, but not limited to, direct connect, Ethernet (e.g., twisted pair 10/100/1000 Base T), transmission control protocol/internet protocol (TCP/IP), token ring, IEEE® 802.11a/b/g/n/x, etc.

The converged network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, serial advanced technology attachment (SATA®), Integrated Drive Electronics (IDE), IEEE®-1394, Universal Serial Bus (USB®), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407 etc. In some embodiments, computer system 400 may store user/application data, such as, the data, variables, records, etc., as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 400 may implement a web browser 408 stored program component. The web browser 408 may be a hypertext viewing application, for example MICROSOFT® INTERNET EXPLORER™, GOOGLE®, CHROME™, MOZILLA® FIREFOX™, APPLE® SAFARI™, etc. Secure web browsing may be provided using Secure Hypertext Transport Protocol (HTPS), Secure Sockets Layer (SSL), Transport Layer Security (TLS), etc. Web browser 408 may utilize facilities such as AJAX™, DHTMLx™, ADOBE® FLASH™, JAVASCRIPT™, JAVA™, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHONT™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure helps enterprises to see less disruption at physical location of datacenters, by enabling support person to troubleshoot communication without being involved at physical location of the datacenters.

An embodiment of the present disclosure reduces resolution time for datacenters and save enterprises from longer outage.

An embodiment of the present disclosure enhances capability of datacenters to provide high bandwidth.

An embodiment of the present disclosure eliminates physical cabling or requirement of a support person in the datacenters by implementing robust and redundant wireless solution.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
|---|---|
| Reference number | Description |
| 100 | Environment |
| 101 | Datacenter |
| 103 | Wireless device |
| 105 | User devices |
| 107 | Converge network |
| 109 | One or more wireless chips |
| 111 | I/O interface |
| 113 | Memory |
| 115 | Processor |
| 200 | Data |
| 201 | Requested data |
| 203 | Network parameter data |
| 205 | Processed data |
| 207 | Other data |
| 209 | Modules |
| 211 | Receiving module |
| 213 | Data request transmission module |
| 215 | Network parameter matching module |
| 217 | Requested data transmission module |
| 219 | Other modules |
| 400 | Computer system |
| 401 | I/O interface |
| 402 | Processor |
| 403 | Network interface |
| 404 | Storage interface |
| 405 | Memory |
| 406 | User interface |
| 407 | Operating system |
| 408 | Web browser |
| 409 | Converged network |
| 412 | Input devices |
| 413 | Output devices |
| 414 | User devices |

-continued

| REFERRAL NUMERALS: | |
|---|---|
| Reference number | Description |
| 415 | Converged network |
| 416 | Plurality of Wireless devices |

What is claimed is:

1. A method of providing wireless data communication for datacentres, the method comprising:
 receiving, by a wireless device of a plurality of wireless devices configured in a wireless datacenter, a data request from a user device associated with a user, wherein each of the plurality of wireless devices are integrated with one or more wireless chips, and the one or more wireless chips are configured with converged network capabilities for facilitating the wireless communication;
 transmitting, by the wireless device, the data request via respective integrated one or more wireless chips of the wireless device to a first wireless device of the plurality of wireless devices associated with the data request, wherein the first wireless device receives the data request via respective integrated one or more wireless chips;
 receiving, by the wireless device, requested data from the first wireless device, wherein the first wireless device processes the data request to provide the requested data; and
 transmitting, by the wireless device, the requested data to the user device;
 matching, by the wireless device, bandwidth of the plurality of wireless devices with bandwidth of the user device using the converged network capabilities
  wherein the converged network capabilities create a tunnel for data transmission, to manage a bandwidth requirement for transmitting the requested data whenever a non-performing user device does not meet the bandwidth requirement for transmitting the requested data using dedicated media.

2. The method as claimed in claim 1, wherein more than one wireless chip integrated with each of the plurality of wireless devices is used when data transmission requires bandwidth more than bandwidth capability of the wireless chip.

3. The method as claimed in claim 1, wherein the user device is wirelessly enabled to communicate with the plurality of wireless devices to facilitate the wireless communication.

4. A wireless device of a plurality of wireless devices for providing wireless data communication in datacentres, comprising:
 a processor; and
 a memory communicatively coupled to the processor, wherein the memory stores processor instructions, which, on execution, causes the processor to:
  receive a data request from a user device associated with a user, wherein each of the plurality of wireless devices are integrated with one or more wireless chips and the one or more wireless chips are configured with converged network capabilities for facilitating the wireless communication;
  transmit the data request via respective integrated one or more wireless chips of the wireless device to a first wireless device of the plurality of wireless devices associated with the data request, wherein the first wireless device receives the data request via respective integrated one or more wireless chips;
  receive requested data from the first wireless device, wherein the first wireless device processes the data request to provide the requested data;
  transmit the requested data to the user device; and
  match bandwidth of the plurality of wireless devices with bandwidth of the user device using the converged network capabilities, by creating a tunnel for data transmission using the converged network capabilities
  wherein the tunnel manages a bandwidth requirement for transmitting the requested data whenever a non-performing user device does not meet the bandwidth requirement for transmitting the requested data using dedicated media.

5. The wireless device as claimed in claim 4, wherein more than one wireless chip integrated with each of the plurality of wireless devices is used when data transmission requires bandwidth more than bandwidth capability of the wireless chip.

6. The wireless device as claimed in claim 4, wherein the user device is wirelessly enabled to communicate with the plurality of wireless devices to facilitate the wireless communication.

7. A non-transitory computer readable medium including instruction stored thereon that when processed by at least one processor cause a wireless device to perform operation comprising:
 receiving a data request from a user device associated with a user, wherein each of a plurality of wireless devices configured in a wireless datacenter are integrated with one or more wireless chips, and the one or more wireless chips are configured with converged network capabilities for facilitating the wireless communication;
 transmitting the data request via respective integrated one or more wireless chips of the wireless device to a first wireless device of the plurality of wireless devices associated with the data request, wherein the first wireless device receives the data request via respective integrated one or more wireless chips;
 receiving requested data from the first wireless device, wherein the first wireless device processes the data request to provide the requested data;
 transmitting the requested data to the user device; and
 matching bandwidth of the plurality of wireless devices with bandwidth of the user device using the converged network capabilities by creating a tunnel for data transmission using the converged network capabilities,
 wherein the tunnel manages a bandwidth requirement for transmitting the requested data whenever a non-performing user device does not meet the bandwidth requirement for transmitting the requested data using dedicated media.

* * * * *